United States Patent [19]

Karlsson

[11] Patent Number: 5,782,961

[45] Date of Patent: Jul. 21, 1998

[54] METHOD FOR THE PROTECTIVE TREATMENT OF MINERAL MATERIAL STRUCTURES, TREATMENT COMPOSITION INTENDED FOR PERFORMING OF THE METHOD AND USE THEREOF

[76] Inventor: Ernst Folke Jean Karlsson. Vintervägen 21, 4 tr, S-171 34 Solna, Sweden

[21] Appl. No.: 716,435

[22] PCT Filed: Mar. 21, 1995

[86] PCT No.: PCT/SE95/00287

§ 371 Date: Sep. 20, 1996

§ 102(e) Date: Sep. 20, 1996

[87] PCT Pub. No.: WO95/25706

PCT Pub. Date: Sep. 28, 1995

[30] Foreign Application Priority Data

Mar. 22, 1994 [SE] Sweden ................. 9400952
Nov. 22, 1994 [SE] Sweden ................. 9404037

[51] Int. Cl.$^6$ ................................ C04B 41/64
[52] U.S. Cl. ............. 106/2; 106/287.1; 106/287.14; 106/490; 427/387; 427/393.6; 427/352; 427/354
[58] Field of Search ............ 106/2, 287.1, 287.14, 106/490; 427/387, 393.6, 352, 354

[56] References Cited

U.S. PATENT DOCUMENTS

| 3,905,823 | 9/1975 | Piskoti | 106/287.14 |
|---|---|---|---|
| 4,076,868 | 2/1978 | Roth et al. | 427/348 |
| 4,352,894 | 10/1982 | Schmidt | 321/91 |
| 4,431,452 | 2/1984 | Comper et al. | 106/287.14 |
| 4,631,207 | 12/1986 | Price | 427/387 |
| 4,648,904 | 3/1987 | DePasquale et al. | 106/287.14 |
| 4,716,051 | 12/1987 | Rödder | 427/136 |
| 4,717,599 | 1/1988 | Merrill | 427/387 |
| 4,804,573 | 2/1989 | McCarthy et al. | 428/201 |
| 4,940,743 | 7/1990 | Grape et al. | 524/377 |
| 4,999,249 | 3/1991 | Deschler et al. | 428/447 |
| 5,021,262 | 6/1991 | Bouillard et al. | 427/289 |
| 5,250,106 | 10/1993 | Roth et al. | 106/2 |
| 5,292,908 | 3/1994 | Onikata et al. | 556/173 |
| 5,421,865 | 6/1995 | Grulke et al. | 106/2 |

FOREIGN PATENT DOCUMENTS

| 1 484 622 | 9/1977 | European Pat. Off. . |
|---|---|---|
| 1 592 569 | 7/1981 | European Pat. Off. . |
| 0049365 | 4/1982 | European Pat. Off. . |
| 0273867 | 7/1988 | European Pat. Off. . |
| 273867-A | 7/1988 | European Pat. Off. . |
| 0362084 | 4/1990 | European Pat. Off. . |
| 0385108 | 9/1990 | European Pat. Off. . |
| 177824-A | 4/1996 | European Pat. Off. . |
| 2356142 | 1/1977 | Germany . |

OTHER PUBLICATIONS

Folke Karlsson: "Moisture Reduction and Impregnation," The NACE Annual Conference and Corrosion Show, Corrosion 93, Paper No. 350/10–340/12, 7–12 Mar. 1993.

Abstract of EP–177824.

*Primary Examiner*—Melissa Bonner
*Attorney, Agent, or Firm*—Birch, Stewart, Kolasch & Birch, LLP

[57] ABSTRACT

The invention relates to a method of treating structures of mineral materials, particularly concrete structures, with hydrophobizing substances in the form of silanes and/or siloxanes which are applied to the surfaces of the structures and absorbed therein by capillary action. The hydrophobizing substances may be applied as a thick layer in the form of a gel-like mass of essentially solvent-free silanes and/or siloxanes together with a vehicle medium of a layer-lattice mineral, such as bentonite or montmorillonite. Vehicle medium residues are removed when the hydrophobizing substance has been absorbed into the treated structures.

23 Claims, No Drawings

5,782,961

METHOD FOR THE PROTECTIVE TREATMENT OF MINERAL MATERIAL STRUCTURES, TREATMENT COMPOSITION INTENDED FOR PERFORMING OF THE METHOD AND USE THEREOF

The present invention relates to a method for the protective treatment of mineral structures, particularly concrete structures. The invention also relates to a composition and the use of the composition when carrying out the method in the treatment of mineral constructions, particularly structures that are comprised of fine-porous material such as high grade concrete, to protect the mineral material from damage, and also possible embedded reinforcement material in the concrete.

BACKGROUND OF THE INVENTION AND CONVENTIONAL ART

Many present-day structures built from mineral materials are subjected to the influence of chloride and water to such an intensity that the structures are unable to serve their intended life span.

It is known that hydrophobizing substances applied to mineral surfaces will reduce the harmful effect of the environment thereon and that the sensitive outer layers of such surfaces will obtain favourable moisture conditions relatively quickly after having been made hydrophobic. (C. f. Folke Karlsson, "Moisture reduction and impregnation", The NACE Annual Conference and Corrosion Show, Corrosion 93, Paper No. 340/10-340/12).

Several different types of hydrophobizing preparations having different properties and compositions for protecting concrete structures against the effect of moisture have been proposed in the art: EP 101 816, EP 273 867, EP 385 108, EP 518 324, SE 404 358 mention different examples of silanes for this purpose. EP 49 365 teaches the use of alkyl silanoles produced from hydrolyzed alkyltrialkoxy silanes.

EP 304 497 mentions siloxanes for this purpose. EP 157 323 and EP 362 084 describe substances which are designated silicone resins. Other compounds and substances are described in EP 186 265, EP 284 085 and SE 419 748. At least the majority of these substances can also be used when carrying out the present invention.

EP 101 816, in particular, describes the use of solvent-free alkyltrialkoxy silanes whose alkyl groups have 3-8 carbon atoms and whose alkoxy groups have 1-2 carbon atoms. It has been found that the solvents proposed in several of the aforesaid patent specifications, both water-insoluble and polar solvents, are disadvantageous. Many solvents are harmful to the health and to the environment. They also heavily dilute the active substance and reduce its protective effect achieved at each treatment occasion while unnecessarily increasing treatment costs.

At present, compounds which render surfaces hydrophobic, ie hydrophobizing substances, are brushed or sprayed onto the surfaces, after having previously cleaned the surfaces with hot water under pressure. When the protective substance is sprayed onto the surfaces to be treated, a large part of the substance is lost by splashing.

In order to achieve a long term protective effect and produce favourable moisture conditions in the outer surfaces of the structure treated, it is necessary for the substance to penetrate deeply into the structure. The amount of protective substance that can be absorbed by the material and the depth to which the substance penetrates decreases markedly with increasing moisture contents of the material. Furthermore, the depth to which a protective substance will penetrate into finely-porous material, such as high-grade concrete, is also greatly limited and, above all, uneven, wherein the protective effect afforded in some surface sections will be poor and will have only a short effective life. Finely-porous concrete structures require the application of large quantities of hydrophobizing substance in order to achieve effective protection at depth. Suction of the substance into the pores of the structure by capillary forces takes place very slowly.

The depth to which the protective substance penetrates can be increased by increasing the amount of substance applied and/or the time in which the substance is in contact with the treated material. One problem in this regard is that it is only possible to apply a thin layer of substance when using a brush or a spray. Because of the long capillary suction time, the applied hydrophobizing substance has time to evaporate or to run off the surface before having penetrated to any depth. This is particularly true in the case of concrete surfaces that have a high moisture content when applying the protective substance. It is therefore often necessary to accept poor quality treatment.

In order to enable large quantities of hydrophobizing substances to be applied and the time in which the substance is in contact with the treated surface to be prolonged, methods have been proposed in which the hydrophobizing substances are applied to the treated surface together with a solvent and a vehicle or carrier medium.

DE 2356142 teaches one such method in which building materials are impregnated with the aid of a gel-like hydrophobizing substance comprised of organosilicone compounds, solvent and a vehicle medium comprised of a material that has a specific surface area of at least 50 $m^2/g$, for instance silica, $SiO_2$. The hydrophobizing substance used to produce a hydrophobic surface is an organopolysilane or an organopolysiloxane, where the aryl groups or alkyl groups have up to 18 carbon atoms. The solvent may be an alcohol, e.g. methanol, ethanol, n-propanol or isopropanol, a ketone such as acetone or methyl ethyl ketone, toluol, xylol, trimethyl benzol, diacetone-alcohol, chlorinated hydrocarbons, such as trichloroethylene and cyclohexanone.

This method cannot be applied on concrete bridges for instances, since the treatment results in coatings which have a disturbing nature and in colour changes on the concrete surfaces. Neither can the method be applied on overhead surfaces, because of the excessively poor adhesion between gel and concrete. The hydrophobizing substance used with this method is also encumbered with hygiene problems, in that it contains organic solvents and silica (a silicosis hazard).

Patent Specification EP 177 824 also describes a gel-like hydrophobic substance comprised of polyorganosiloxanes, solvent and a vehicle comprised of layer-lattice silicate, and a method of applying the substance. A layer-lattice silicate of the montmorillonite type is particularly proposed (C. f., for instance, Ullman, Enc. der Techn. Chemie, 4. Auflage, Band 23, S. 312-15). Proposed known siloxanes are straight or branched organopolysiloxanes, resinous polysiloxanes and alkoxy functional polysiloxanes. Proposed solvents are white spirit, alkylated aromatic solvents and polar solvents as methanol, ethanol, acetone and glycol ether. The quantity of white spirit solvent used is many times greater than the quantity of the active siloxane component in all of the embodiments. When this substance is used on concrete for instance, the aesthetically disturbing effect is much lower than when silica is used as the vehicle medium. However, the colour changes induced by this substance are so pronounced that the method cannot be applied, for instance, on concrete bridges that are located in aesthetically sensitive municipal areas.

The known method also has the following drawbacks:

The large quantity of solvent used means that a large percentage of the capillary forces available to draw liquid into the building material is effective in drawing into the material the solvent in which the hydrophobic substance is dissolved.

The active component which imparts hydrophobic properties to the surfaces of the building material is comprised of siloxanes whose molecules are much too large to be able to penetrate at depth into finely-porous building materials, such as high-grade concrete.

However, the primary reason why these two substances have not been used in practical applications is because of their dominant content of organic solvent, such as white spirit, which does not allow the protective substance to fulfil the requirements and demands relating to the care and protection of the environment and also to the protection of the workmen involved. Neither do such protective substances have the expected increased depth penetration, due to the large quantities of solvent used.

For these reasons, no vehicle medium has hitherto been used when applying silanes and/or siloxanes to protect concrete against the ingress of moisture. Instead, the hydrophobizing substances mentioned in the introduction have been used in a concentrated form or have been diluted with solvent.

Present-day treatment processes for giving the surfaces of structures hydrophobic properties often provide an inefficient and short-lived protection, due to the shallow and uneven penetration of the hydrophobic substance used. Impact forces from, e.g., stones and solid particles thrown against protected surfaces by passing traffic, or damage to such surfaces caused by vehicles or by moving goods or waste containers are liable to render the protective effect locally ineffective or even non-existent. A treated surface which has not been penetrated effectively will also lose its protective effect as a result of decomposition caused by UV-light.

The protection of structural surfaces against moisture when using present-day techniques results in a varying quality of the hydrophobicity produced, since the moisture content of the building material to be treated often varies within wide limits. The chloride filtering effect and the moisture stabilizing effect are both greatly limited and short-lived when the protective substance is applied to a wet material surface. Outdoor constructions mostly have a high moisture content.

SUMMARY OF INVENTION

The object of the present invention is to provide a hydrophobizing substance and a method of its application which are improvements on present-day substances and methods from both an environmental and a technical aspect, which do not have the aforementioned drawbacks and which can also be applied on moist surfaces and which amplify penetration of the hydrophobic liquid into the treated material, particularly in finely-porous material such as high-grade concrete, and which will provide a high and primarily uniform treatment quality without resulting in any change in colour of the treated surface whatsoever. A further object of the invention is to provide a use of the method and the protective substance for treating structures comprised of mineral material such as to prolong the effective life span of such structures by preventing moisture and chloride ions penetrating thereinto.

These objects are achieved by the present invention, the characteristic features of which are set forth below.

DETAILED DESCRIPTION OF INVENTION

The inventive method involves brushing, spreading or spraying the surface of the mineral material with an even layer of a surface-adhering compound which contains generally solvent-free silanes and/or siloxanes and a vehicle medium which includes a layer-lattice mineral, preferably bentonite. The silanes and/or siloxanes will thereafter successively leave the compound and be drawn into the material by capillary forces until the compound has been depleted of hydrophobizing substance. Remaining compound can be removed, e.g., by brushing the treated surface, or by cleaning the surface with compressed air or water.

Application of the inventive method and inventive substance enables the load exerted on the material by chloride and water to be reduced, and also to obtain a low and stable moisture level in the outer surfaces of the material and thereby increase the effective life span of the treated construction, such outer surfaces being those structural surfaces that are most subjected to such loads.

U.S. Pat. No. 5,292,908 describes a substance in the form of a modified bentonite which is given an addition of 0.5–15% alkyltrialkoxy silanes to render the bentonite dispersible in water. The intention is to mix the modified bentonite with water so as to change the viscosity of the water. This substance differs totally from the inventive substance. The known substance is comprised of a bentonite powder with the bentonite grains covered with a thin silane layer. The inventive substance is comprised of bentonite suspended in essentially solvent-free silanes and/or siloxanes to form a gel-like mass or compound which will adhere well to a concrete surface when hydrophobizing the surface.

In principle, any silanes and siloxanes having a hydrophobic action in accordance with the aforesaid patent specifications can be used when applying the invention. Particularly advantageous are silanes that have 2–18 carbon atoms in the alkyl group and 1–2 carbon atoms in the alkoxy group, and corresponding siloxanes. The active hydrophobicity-promoting substance used will preferably be silanes, whose small molecules are particularly capable of penetrating deeply into finely-porous material. Siloxane is used when additionally strong protection is required on the surface of the material treated. When strong surface protection and a deep penetrating effect are both desired, there is used a combination of silane and siloxane, optionally on different treatment occasions.

A particularly high alkali resistance and good hydrophobicity is obtained with silanes whose alkyl part is comprised of isobutyl. A particularly good protective effect is obtained with silanes whose alkoxy part is comprised of ethoxy, which causes the active substance to react slowly, which is favourable when the active substance is in contact with the treated material over a long period of time. Very long contact times are obtained when practicing the inventive method.

The inventive composition, or compound, contains a vehicle medium which includes layer-lattice mineral material. Layer-lattice minerals which have swelling properties and which will form a gel-like mass with essentially solvent-free silanes and/or siloxanes, optionally after being modified and/or admixed with a gel-forming auxiliary, are particularly advantageous. Montmorillonite, also known as smectite, and bentonite are examples of such layer-lattice minerals. Other conceivable minerals are hectorite, vermiculite and composite mineral of a mixture of illite and smectites having swelling properties. The mineral is added in an amount corresponding to about 1-25 percent by weight, preferably 2-15 percent by weight and more preferably 2-10 percent by weight.

Preferably, the vehicle medium will be so-called organophil bentonite, wherein a minor quantity of solvent is preferably mixed therein. The solvent that may be used can be any one of the polar solvents mentioned in the introduction. The sole purpose of the solvent is to facilitate or enable the formation of a gel when mixing-in the layer-lattice mineral. The solvent evaporates and forms no part of the hydrophobic protection. The solvent chosen may be one which is the least harmful to the workmen concerned and to the environment. Ethanol has been found to be a suitable solvent in this regard. The amount of solvent required will depend on the extent of the pretreatment of the bentonite. The polar solvent used, preferably ethanol, is added in an amount corresponding to 0-10 percent by weight, preferably 1-8 percent by weight and more preferably 1-5 percent by weight.

The invention has the following features and advantages, among others:

There is used an essentially solvent-free silane and/or siloxane to increase the amount of active substance absorbed and to reduce the environmental load on the surroundings and on the workmen concerned.

The silane and/or the siloxane is mixed with a vehicle medium and applied in a layer of chosen thickness, thereby enabling the contact time to be extended and the quality of hydrophobicity to be controlled by choosing a suitable thickness.

When the surface to be treated is only moderately dirty, it is not necessary to wash the surface with high-pressure hot water prior to applying the protective coating, thereby avoiding the risk of increasing the moisture level in said surface. This eliminates one working operation and also eliminates the need to wait for the surface to dry before being able to apply the protective substance.

As opposed to a liquid protective substance, there is very little splashing and therewith very little loss when spraying the inventive compound.

According to one advantageous embodiment of the invention, when the surface layer of the material to be treated has a high moisture content or is thoroughly wet and/or exhibits large variations in moisture content, the surface is pre-treated with a silane and/or siloxane preparation or with a compound according to the invention. This pretreatment of the surface causes the concrete to dry-out, even in humid weather conditions, and neither is the surface able to absorb further moisture. The outer surface of the material adjusts to a low and uniform moisture level within a given period of time, so that the surface is able to absorb hydrophobizing substance to a large depth. After having prepared the surface of the mineral material in this way and allowing the surface to dry, the inventive compound is applied in a second treatment step.

One advantage afforded by this pretreatment process is that it promotes a final treatment of uniform quality. This enables a high and uniform quality to be obtained irrespective of local variations in the moisture content of the material. Protective treatment of particularly good quality is obtained when the inventive compound is also used in the pretreatment process.

According to another advantageous embodiment of the invention, a membrane curing agent is applied to the surface of the compound. This prevents evaporation of active hydrophobizing components and, instead, provides more time for the hydrophobizing components to be drawn into the material being treated. This is particularly beneficial in the case of long contact times and/or in hot or windy weather, i.e. conditions in which silane/siloxane will evaporate relatively intensely from the surface of the compound. The agents used in this respect are the same as those used to prevent newly cast concrete from drying-out as the concrete cures or sets.

PREFERRED EMBODIMENTS OF INVENTION

The invention will now be illustrated with reference to a number of non-limiting examples in which the silane used in Examples 1-3 and 5 is isobutyltriethoxy silane. All percentages recited in the Examples and in the following Claims are percentages in weight.

EXAMPLE 1

A number of mixing tests were carried out on a laboratory scale. 80-87% concentrated silane, 10-15% bentonite (trade name Bentone 34) and 3-5% ethanol were mixed with the aid of a slowly rotating stirrer. There was obtained a relatively highly viscous liquid which could be sprayed easily onto a surface and which after being sprayed gave a compound which adhered to the surface, even on overhead surfaces. The choice of another bentonite product and the use of a more intensive mixer can be expected to provide a product of desired consistency and adhesiveness when applied in thick layers and when using less bentonite, possibly a bentonite content of about 1%.

EXAMPLE 2

A field test was carried out on the surface of a bridge, using a compound produced in accordance with Example 1. A suspension or compound consisting of 84% concentrated silane, 3% ethanol and 13% bentonite was applied to the surface in a thickness which varied from 1-3 mm. It was observed that when applying the inventive method, the colour of the treated surface remained unchanged and that, if anything, the surface became cleaner. Dried-out "bentonite pellets" could be removed easily with a brush after two calendar days. All surfaces, including overhead surfaces could be treated in accordance with the invention.

A reference surface was treated with a reference compound prepared in accordance with Patent Specification EP 177 824 and consisting of 15% siloxane, 70% white spirit, 11% bentonite and 4% ethanol.

This method resulted in a compound which was still sticky after more than twenty-one calendar days, and the white spirit present gradually left a dark coloured and streaky surface. It is possible that such discolouration can be accepted in many instances, although definitely not on a concrete bridge in a city or town environment.

EXAMPLE 3

A field test was carried out on the underside of a street bridge with a concentrated silane product admixed with 15-20% bentonite. The gel was sprayed onto the treated surface to a thickness of less than 1 mm. Silane was sprayed onto a reference surface twice with a ten-hour wait between applications. The treatment compound was removed after three calendar days and sample bodies having a diameter of 100 mm were drilled from the surfaces. These bodies were cracked along a diameter after a further fourteen calendar days. Water was sprayed on the cut surfaces in order to determine the penetration depth in mm. The result is shown in Table 1.

The outer cylindrical surface of a concrete core drilled from each of the sample surfaces 1 and 2 and the fracture surface opposite the treated surface were sealed with epoxy resin, whereafter the sample bodies were stored outdoors under a roof for a total of four weeks. The earlier treated surfaces were then treated finally with silane gel applied to a thickness of 1 mm. The compound was removed after three calendar days and the penetration depths of the cracked cores were measured after a further fourteen calendar days.

The results are shown in Table 1. In the case of the inventive compound, the smallest penetration depth was 5 mm, whereas the surfaces sprayed two times in accordance with present-day techniques showed a penetration depth as low as 1 mm. A larger and more uniform penetration depth was obtained with the gel treatment. The variations in penetration depths occurring even when treating with a gel are due to the fact that concrete is an inhomogeneous material containing alternate coarse ballast particles and porous absorbing parts of cement paste which bind large quantities of hydrophobizing agent on the pore surfaces.

TABLE 1

| Test Treatment | | Penetration depth, mm | | | |
|---|---|---|---|---|---|
| No. | | Min | Max | Mean | Min/Max |
| 1 | Two sprays with silane liquid at an interval of 10 h (Reference) | 1 | 20 | 6.9 | 0.05 |
| 2 | Silane gel | 5 | 20 | 11.7 | 0.25 |
| 3 | Pretreatment according to 1 and final treatment with silane gel | 8 | 22 | 13.2 | 0.36 |
| 4 | Pretreatment according to 2 and final treatment with silane gel | 12 | 28 | 18.1 | 0.43 |

EXAMPLE 4

Laboratory tests were carried out at a relative humidity (RH) of 87–94% on concrete specimens measuring 140×140 mm and a thickness of 20–40 mm, the specimens being made of bridge concrete. Five different types of hydrophobizing compounds were tested.

| a) 100% silane (Reference) | (S) |
|---|---|
| b) 85% silane, 12% Bentone 34, 3% ethanol | (S-gel) |
| c) 14% siloxane, 75% white spirit, 7% Bentone 34, 4% ethanol (Reference) | (14SXR-gel) |
| d) 75% silane, 25% siloxane | (75S/25SX) |
| e) 58% silane, 20% siloxane, 19% Bentone 34, 3% ethanol | (75S/25SX-gel) |

Each test included two sample bodies and the results are shown as the mean value thereof.

TABLE 2

| Step 1 | Step 2 | Absorbed quantity, g/m$^2$ | Penetration depth mm |
|---|---|---|---|
| Brushing S (Reference) RH = 94% | — | 72 | 0.4 |
| 14SXR-gel (Reference) RH = 94% | — | 644 (Siloxane = 103) | 2.9 |
| S-gel RH = 94% | — | 895 | 10.0 |
| 75S/25SX-gel RH = 94% | — | 465 | 9.5 |
| Brushing S RH = 94% | S-gel | 830 | 13.0 |
| Brushing 75S/25SX RH = 94% | S-gel | 850 | 18.0 |
| 75S/25SX-gel RH = 87% | — | 605 | 19.0 |

The hydrophobizing compounds were brushed on the sample bodies two times with an hour interval between each application or, alternatively, a gel coating was applied at a thickness of about 2 mm. The gel was removed after one week. Some of the sample bodies were retreated after a further two weeks at an RH=70%. The sample bodies were then weighed to determined the amount of liquid that had been absorbed, and the penetration depths were determined by spraying water onto cracked sample bodies.

The results are shown in Table 2.

EXAMPLE 5

The bottom surfaces, measuring 143 cm$^2$ in area, of two glass bowls were coated with silane gel to a depth of about 3 mm. The silane gel in one bowl was provided with a membrane curing agent, trade name Masterseal MB 429. The bowls were then placed in a fume cupboard for twenty-four hours. The bowls were then weighed to determine the amount of silane that had evaporated off. The results are set forth in Table 3.

TABLE 3

| Sample | Time | g | g/m$^2$ | g/m$^2$, h |
|---|---|---|---|---|
| Silane gel | 1 h | 1.5 | 105 | 105 |
| | 12 h | 17.0 | 1186 | 99 |
| | 24 h | 30.9 | 2157 | 90 |
| Silane gel with membrane curing agent | 1 h | 1.2 | 84 | 84 |
| | 12 h | 10.2 | 713 | 59 |
| | 24 h | 12.7 | 888 | 37 |

The values relating to silane gel with membrane curing agent are rather high, because the values also include solvent evaporated from the membrane curing agent.

The tests show that when practicing the invention, more hydrophobizing agent is taken-up by the material and the depth of penetration is much greater than that achieved with present-day techniques, without any aesthetically disturbing discolouration of the treated surfaces. However, the primary benefit is that effective penetration is achieved over the whole of the surface treated. This affords the following advantages:

The method results in a lasting improvement of the moisture conditions in the outer surfaces of the material.

The ability of the material to repel chlorides and water is improved.

The effective life span of the treatment increases because of the increase in penetration depth, and primarily due to greater minimum penetration.

The inventive method and the inventive compound provide a protective treatment quality which is highly superior to the quality obtained when practicing known techniques, and the inventive method and inventive compound are therefore particularly suitable for treating structures which are not easily accessible, such as underground bridge piers, where high quality protection of long duration is desirable because of the high costs associated with the treatment of such structures.

One very important advantage afforded by the invention is that the hydrophobic quality of the treated surfaces is both high and uniform and can be controlled by varying the contact time and the thickness of the applied compound, due to the uniform moisture conditions achieved with the pretreatment of said surfaces. Because the penetration depths have a high minimum value, it is possible to combine the protective treatment of surfaces in accordance with the invention with an antigraffiti treatment. This is not always possible in the case of present-day techniques. The hydrophobicity of the treated surface readily deteriorates or neutralizes in areas of limited penetration of an externally applied surfactant-based antigraffiti substance having hydrophilic properties. The greater penetration depth achieved by means of the invention enables a hydrophobic surface to be applied to reinforcement bars with low concrete cover, thereby preventing the bars from corroding.

Another advantage afforded by the inventive treatment method is that it can be carried out without harm to the workmen concerned and to the surroundings.

When practicing the inventive pretreatment method, optimal drying of the outer surface of the treated material can be achieved irrespective of the weather conditions. The effective life span of the treatment is always optimal and totally independent of the moisture conditions that prevail when the inventive treatment compound is applied.

The invention can be applied on new constructions to reduce their sensitivity to chloride loads and to improve the moisture conditions in the material and thereby give the constructions a longer length of life. As a result of the greater penetration depth achieved with the inventive method, the method can be applied to advantage on concrete structures which at present are not rendered hydrophobic.

The present invention can be applied particularly advantageously to hydrophobize concrete bridge roadways and concrete vehicle parking floors. At such places greater penetration depths should be achieved with surfaces of this nature due to the scoring and rutting caused by the vehicles travelling therealong. The hydrophobization of such structures in accordance with the invention will so effectively protect the structures against the ingress of water and salt as to enable the structures to be built without needing to include expensive membrane insulation against water and asphalt coating on the upper surface of such structures, which is the practice at present.

The invention can also be applied on older constructions which have decomposed to a greater or lesser extent. Treatment of constructions in accordance with the invention removes the need to make expensive repairs by replacing damaged material. The moisture condition of the surface layer will adjust to a low and stable level relatively quickly, therewith halting or markedly retarding decomposition of the material and any reinforcement material embodied therein, irrespective of the cause of decomposition. A number of examples in this respect are given below.

\* Assume that the concrete of a concrete bridge pier has become infected with chloride and has begun to decompose as a result of salt-frost attack and chloride-initiated reinforcement corrosion. At present, it would be necessary to repair such piers and columns by removing the chloride contaminated concrete, which is an expensive operation. By temporarily coating the contaminated pier or column with the inventive compound in the aforedescribed manner, favourable moisture conditions will be established relatively quickly in the covering layer externally of the reinforcement, therewith halting or at least retarding the decomposition of concrete and reinforcement material for a long period of time.

\* Assume that the bottom reinforcement of a bridge deck slab has corroded because carbonation of the concrete has reached the reinforcement. At present, it is necessary to repair such damage by removing the carbonated concrete, which is an expensive operation. In accordance with the invention, the undersurface of the bridge deck slab is treated in two stages with an initial silane treatment process and the surface is allowed to dry-out, whereafter the surface is treated with a hydrophobizing compound. Corrosion will now stop relatively quickly, because the moisture level adjacent the bottom reinforcement adapts to a low and stable level.

\* Assume that a vertical concrete retaining wall has suffered superficial damage due to alkali silica reactions (ASR). By protective treating the surface in the aforedescribed manner, the moisture conditions in the covering layer are brought to such low values and such stable states as to render impossible continued decomposition by ASR.

\* Assume that the upper surface of a vehicle parking floor has suffered salt damage. The effective life span of the floor can be increased by treating the upper surface in accordance with the invention.

\* Assume that a stone object of irregular shape and having a culture/historic value requires protection against frost decomposition. By treating the object in the aforedescribed manner, the effective life span of the object can be greatly extended.

It will be understood that the invention is not restricted to the illustrated exemplifying embodiments thereof, and that these embodiments can be modified within the scope of the inventive concept as defined in the following Claims. For instance, it is unessential which known silane or siloxane is used when practicing the invention, provided that it has a hydrophobizing effect. The ratio of silane to siloxane in the prepared mixtures is also unimportant with regard to the effect achieved by the invention, namely the provision of uniform and deep penetrating hydrophobization of the treated construction. On the other hand, the properties of the hydrophobized layer are dependent on the silane and/or siloxane used. Silane provides generally a deeper penetration than the corresponding siloxane, and the siloxanes provide a surface which is highly water-repellant. Both effects are achieved with mixtures of, e.g., 25–75% or 90–10% in either direction. In the case of mixtures in which silane or siloxane is present in a concentration below 10%, the effect of the other substance will probably dominate.

I claim:

1. A method for treating structures built from mineral materials which comprises applying to the surfaces of a structure a gel-like composition which comprises essentially solvent-free hydrophobizing substances consisting essentially of 75 to 100% silane and 0 to 25% siloxane together with a vehicle medium which includes an organophil layer-lattice mineral with water swelling properties and removing residues of said medium after the hydrophobizing compound has been drawn into the structure by capillarity.

2. A method according to claim 1, wherein the composition is applied on to the surfaces by brushing, spreading or spraying the composition onto said surfaces.

3. A method for the treatment of wet or moist surfaces of structures built from mineral materials which comprises pretreating the moist surfaces by applying thereto a hydrophobizing substance which contains at least one silane and/or siloxane, and optionally a vehicle medium, which includes an organophil layer lattice material with water swelling properties; allowing the surfaces to dry out; and then treating the surfaces by applying a gel-like composition which comprises essentially solvent-free hydrophobizing substances consisting essentially of 75 to 100% silane and 0 to 25% siloxane together with a vehicle medium which includes an organophil layer-lattice mineral with water swelling properties and removing residues of said medium after the hydrophobizing compound has been drawn into the structure by capillarity.

4. A method according to claim 1, further comprising applying a membrane curing agent to the surface of the applied composition after applying the composition on the surfaces of the structure to minimize evaporation of the hydrophobizing substances.

5. A method according to claim 1, wherein the composition comprises 0–10% polar solvents; about 1–25% of a layer-lattice mineral; and the remainder said hydrophobizing substances.

6. A composition for the treatment of constructions built from mineral materials which comprises essentially solvent-free hydrophobizing substances consisting essentially of 75 to 100% silane and 0 to 25% siloxane; and a vehicle medium comprised of an organophil layer-lattice mineral with water swelling properties.

7. A composition according to claim 6, which further comprises 1–10% of a polar solvent to improve the properties of the vehicle medium.

8. A composition according to claim 6, wherein the hydrophobizing substance is a silane or a mixture of silanes.

9. A composition according to claim 6, wherein the hydrophobizing substance is a mixture of 75–90% silane and 25–10% siloxane.

10. A composition according to claim 8, wherein the silane is at least partially comprised of isobutyltriethoxy silane.

11. A method for treating structures built from mineral materials which comprises applying to the surfaces of the structures, a composition as claimed in claim 6 and removing residues of said medium after the hydrophobizing substance has been drawn into the structures by capillarity so as to protect the structures against the effect of water and/or chloride.

12. A method according to claim 1, wherein the structures built from mineral materials are concrete structures.

13. A method according to claim 1, wherein the layer-lattice mineral is bentonite or montmorillonite.

14. A method according to claim 1, wherein the composition comprises 1–8% polar solvents; 2–15% of a layer-lattice mineral; and the remainder said hydrophobizing substances.

15. A method according to claim 1, wherein the composition comprises 1–5% polar solvents; 2–10% of a layer-lattice mineral; and the remainder said hydrophobizing substances.

16. A composition according to claim 6, wherein the layer-lattice mineral is bentonite or montmorillonite.

17. A composition according to claim 6, wherein the composition comprises 1–8% polar solvents; 2–15% of a layer-lattice mineral; and the remainder said hydrophobizing substances.

18. A composition according to claim 6, wherein the composition comprises 1–5% polar solvents; 2–10% of a layer-lattice mineral; and the remainder said hydrophobizing substances.

19. A composition according to claim 6, wherein the polar solvent is ethanol.

20. A composition according to claim 6, wherein the silane and siloxane have at least an alkyl group of 2–18 carbon atoms and an alkoxy group of 1–2 carbon atoms.

21. A method according to claim 1, wherein the silane and siloxane have at least an alkyl group of 2–18 carbon atoms and an alkoxy group of 1–2 carbon atoms.

22. A method according to claim 1, wherein the hydrophobizing substance is a silane or a mixture of silanes.

23. A method according to claim 5, wherein the hydrophobizing substance is a silane or a mixture of silanes.

\* \* \* \* \*